United States Patent

Sugden et al.

[11] Patent Number: 5,905,406
[45] Date of Patent: May 18, 1999

[54] DEMODULATOR FOR A PULSE WIDTH MODULATED SIGNAL AND METHOD

[75] Inventors: David Mark Sugden, Ilkley; Andrew Martin Roberts, Leeds, both of United Kingdom

[73] Assignee: Switched Reluctance Drives Limited, Harrogate, United Kingdom

[21] Appl. No.: 08/845,965

[22] Filed: Apr. 30, 1997

[30] Foreign Application Priority Data

Apr. 30, 1996 [GB] United Kingdom .................... 9608819

[51] Int. Cl.⁶ ................................ H03D 3/00; H03K 9/08
[52] U.S. Cl. ........................ 329/312; 375/238; 375/340; 360/29
[58] Field of Search .................... 329/312; 332/109–111; 327/31, 37; 375/238, 340; 360/29

[56] References Cited

U.S. PATENT DOCUMENTS

| | | | |
|---|---|---|---|
| 3,740,491 | 6/1973 | Cook et al. ............................ | 360/29 X |
| 4,003,083 | 1/1977 | Gariazzo ................................... | 360/29 |
| 4,066,978 | 1/1978 | Cox, Jr. et al. ........................ | 331/17 X |
| 5,140,256 | 8/1992 | Hara . | |
| 5,553,100 | 9/1996 | Saban et al. . | |

FOREIGN PATENT DOCUMENTS

| | | |
|---|---|---|
| 0 007 209 A1 | 1/1980 | European Pat. Off. . |
| 0 048 896 A2 | 4/1982 | European Pat. Off. . |
| 2 016 245 | 9/1979 | United Kingdom . |

OTHER PUBLICATIONS

"PWM signal generator"—XP–002073028. Young, Lee, Derwent Publications Ltd., London, GB; Section EI, Week 9623, 1994–08–31.

*Primary Examiner*—David Mis
*Attorney, Agent, or Firm*—Patterson & Keough, P.A.

[57] ABSTRACT

A demodulator for a pulse width modulated signal comprises a counter arranged to count in one direction when the PWM signal is "high" and in the opposite direction when the PWM signal is "low" to arrive at a count representative of a duty cycle. As a result, a value representative of the duty ratio of the PWM signal can be obtained from the up/down counter. In a further embodiment, the up/down counter is clocked by the output of a frequency multiplier, the output of the frequency multiplier having a frequency determined by the pulse width modulated signal frequency multiplied by a predetermined factor. The value of the duty ratio of the PWM signal can then be found regardless of the frequency of the PWM signal.

33 Claims, 4 Drawing Sheets

DEMODULATOR FOR A PULSE WIDTH MODULATED SIGNAL AND METHOD

BACKGROUND OF THE INVENTION

1. Field of the Invention

The invention relates to demodulators for pulse width modulated signals and, in particular, to such demodulators for measuring the pulse width of signals with variable pulse frequency.

2. Description of Related Art

The transmission of information using pulse width modulation at a constant pulse frequency is well known. In such systems a signal comprises a series of pulses at a constant frequency, the "high" or "on" period of the pulse, and hence the width, providing information, for example the sampled amplitude of an analog signal. The information can be represented by the "duty ratio", that is, the ratio of the "on" period of the pulse to the sum of the "on" period and the "off" period. The sum of the "on" and "off" periods is the constant period of the signal.

It is further known that information may be conveyed in a variable frequency pulse width modulated signal, that is, where the period of the signal is not constant. Attempts have been made to carry out measurements of such signals using analog techniques, for example those using a low-pass filter, wherein the average DC voltage is measured. Such systems necessarily require costly analog components as well as special calibration.

SUMMARY OF THE INVENTION

It is an object of the invention to provide a demodulator capable of demodulating a pulse width modulated signal using digital components.

According to an embodiment of the invention a demodulator for a pulse width modulated (PWM) signal, which signal alternates between first and second states, comprises: an up/down counter having a PWM signal input and a set input for a signal indicative of an event in the PWM signal period to which the counter is responsive to set a predetermined first value therein; count rate setting means for setting a count rate of the counter to count from the predetermined first value to a predetermined second value over the PWM signal period, the up/down counter being responsive to one of the first and second states of the PWM signal at the said event to count in one direction from the first value and, thereafter, responsive to the other of the first and second states of the PWM signal to count in the other direction, such that an output of the up/down counter is a value representative of the duty ratio of the PWM signal.

Embodiments of the invention provide a demodulator that counts in opposite directions for the high and low parts of the PWM signal. The final value of the up and down counting at the end of the PWM signal period is the equivalent of the duty ratio of the PWM signal.

Embodiments of the invention can be arranged to demodulate PWM signals in which the period, and therefore the frequency, is variable. This is achieved by linking the rate of the count to the prevailing PWM signal period. By this correlation the count rate will be adjusted to the PWM signal period, such that the rate will be higher when the period is short and lower for a longer period.

Preferably, the demodulator includes a frequency multiplier, having a system clock input, an up counter, a latch arranged to latch on each PWM signal rising edge, and a programmable divider, and a fixed ratio divider arranged to divide by the counting range value. The up counter is arranged to count up at the system clock rate divided by the fixed ratio divider and output a maximum up count value to the latch. The programmable divider is arranged to receive the up count value from the latch and divide the system clock frequency by the latched up count value. The counting range value may be determined by deriving the minimum number of up counts of the up counter in the frequency multiplier within a minimum specified PWM period to achieve a desired error value. The system can thus be configured to operate within a desired error tolerance.

The demodulator may be arranged to output a "no-PWM" signal when the PWM frequency drops below a specified value. The up counter of the frequency multiplier may include a predetermined maximum up count value, and the demodulator may be arranged to output a "no-PWM" signal when the maximum up count value is exceeded.

BRIEF DESCRIPTION OF THE DRAWINGS

The present invention can be put into practice in various ways, some of which will now be described by way of example with reference to the accompanying drawings, in which.

DETAILED DESCRIPTION OF PREFERRED EMBODIMENTS

A pulse width modulated waveform to be measured is generated from an external source, for example from sampling an analog waveform. The analyzing system of the present invention is preferably incorporated in an application-specific integrated circuit (ASIC) and the waveform is input to the ASIC. The system is also suitable for incorporation in a Field Programmable Gate Array.

Figure 1:
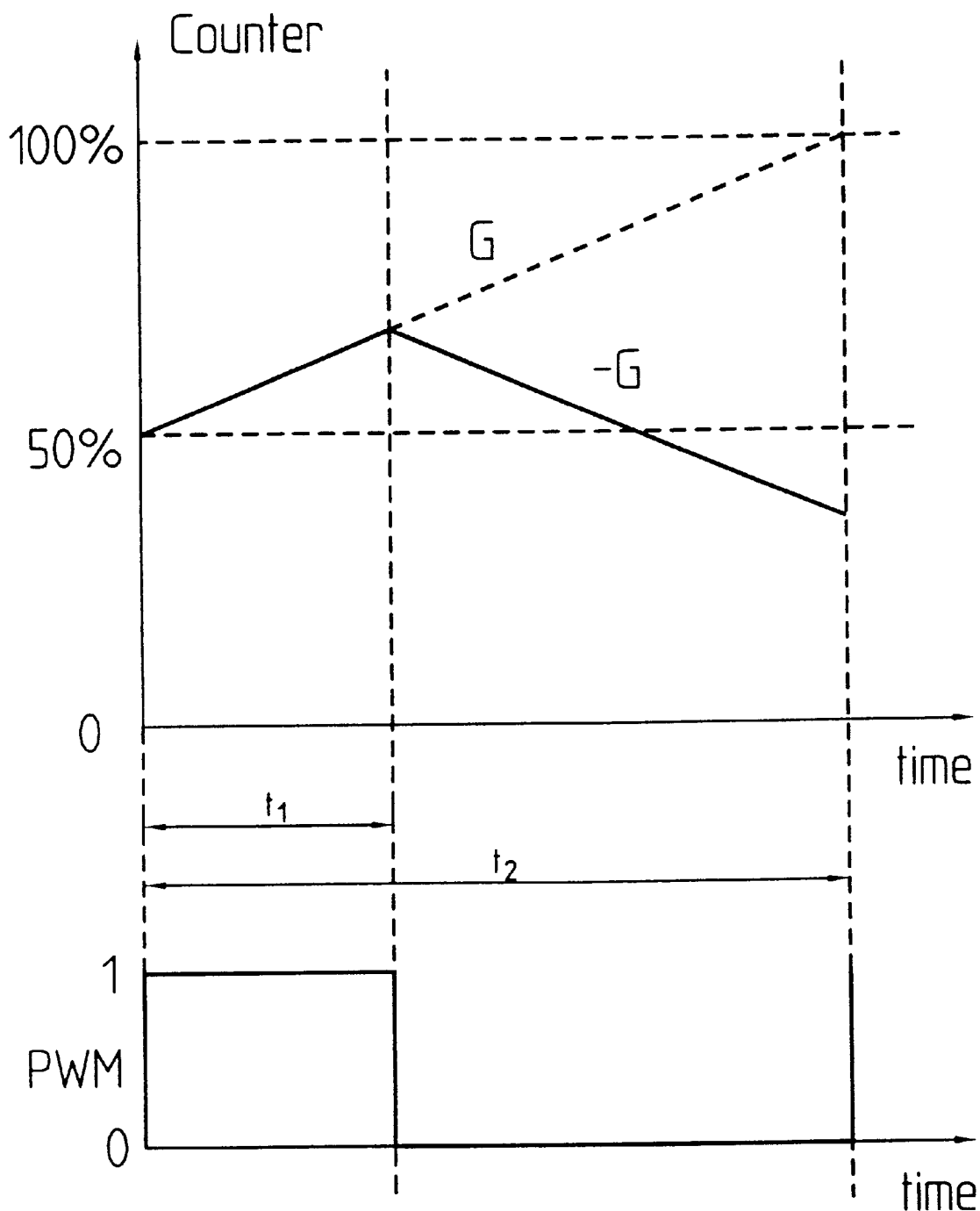
FIG. 1 illustrates the operation of an up/down counter.

The demodulation of the signal is described firstly with reference to FIG. 1. A sample PWM signal is shown at the bottom of the figure, having a high value "one" and a low value "zero". A measurement circuit includes an up/down counter capable of counting over a range between zero and a selected upper number. At the beginning of a cycle of the PWM signal the counter is loaded with a value at the center point of its range. When the PWM input is high, the counter counts up and when it is low the counter counts down. The counter is set to count at a rate such that if the PWM signal were high for a whole period the counter would reach its upper limit (i.e. up to 100%) exactly at the end of the signal period.

An N-bit counter is used having upper limit $2^N$ and a 50% (start) value of $2^N/2=2^{N-1}$. Accordingly, in order for the counter to fill to its maximum count value, it must be capable of making $2^{N-1}$ counts within the period. Accordingly, the actual frequency at which the counter counts will be a function of the number of counts required in a PWM period (which is in turn dependent on the number of bits utilized in the counter). In fact, the count frequency is achieved by multiplying the PWM frequency by $2^{N-1}$, or:

$$f_{COUNT} = f_{PWM} \times 2^{N-1} \tag{1}$$

For example, with a 10-bit up/down counter, the input frequency of the PWM is multiplied by 512 and that frequency is used as the clock enable to the counter. This method is satisfactory for those situations where the input frequency of the PWM waveform is known in advance to be either constant or to have very small variations around a constant value.

As an example of such a system in operation, FIG. 1 shows the count rate, given by gradient G, of the counter such that if it counted up for the entire PWM period it would reach 100%. The counter increments from a start level of 50% along the line G for as long as the PWM signal is high. Once the PWM signal goes low, the counter decrements at an equivalent rate, i.e. along a gradient –G. The end count then provides a measure of the PWM duty cycle. For example, for a pulse comprising a short time at value 1 followed by a long time at value 0, the counter will only increment by a small number of counts and then decrement by a larger number of counts toward the zero count. For a pulse comprising 50% at value 1, the counter will increment and decrement by the same number and restore to its 50% level. For a pulse with a long time at value 1, the counter will increment further towards its upper limit and than it decrements toward its lower limit.

Mathematically, the system can be described as shown below and with reference to FIG. 1. The desired gradient is shown as G in FIG. 1, and the numbers of counts are expressed simply as percentages (i.e. they are normalized to the maximum count of the counter).

Let: (2)

$G$ = gradient of ramp $t_1$ = PWM signal high time $t_2$ = PWM signal period $\hat{s}$ = value of up/down counter after $t_1$ has elapsed $s$ = value of up/down counter after $t_2$ has elapsed $\hat{s} = 50 + Gt_1$ $s = \hat{s} - G(t_2 - t_1)$
$= 50 + Gt_1 - G(t_2 - t_1)$
$= 50 + G(2t_1 - t_2)$ but $G = \dfrac{50}{t_2}$ $s = 50 + \dfrac{50}{t_2}(2t_1 - t_2)$ $= 50 + 100\dfrac{t_1}{t_2} - 50$ $= 100\dfrac{t_1}{t_2}$ It can be seen therefore that, with the up/down counter counting at the desired rate (i.e. slope or ramp of gradient G), the end value obtained by the counter will give a value that represents the PWM duty ratio.

It will be realized that the counter could equally well count downwards for the PWM signal being high and upwards for the PWM signal being low.

If the frequency of the PWM signal varies significantly, the system described above will not produce the correct result, because the rate at which the counter operates no longer matches the period of the input waveform. This difficulty is overcome by locking the count frequency to the frequency of the PWM waveform. This is done by having the clock enable input of the up/down counter driven from a circuit which is responsive to the frequency of the PWM waveform.

Figure 2:
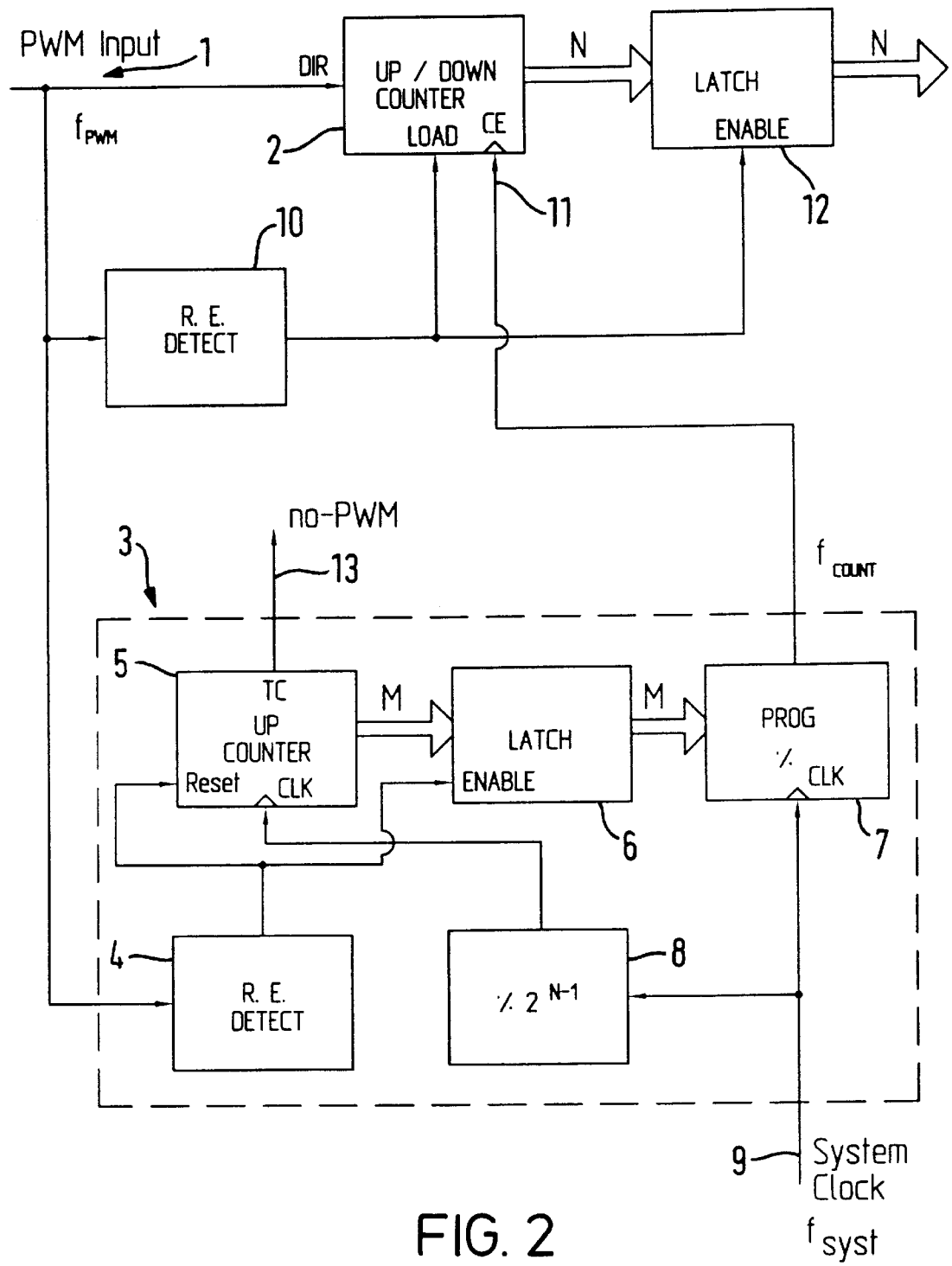
FIG. 2 is a block diagram of a demodulator according to one embodiment of the present invention.

FIG. 2 is a block diagram showing the components of such a PWM signal demodulator. The principal components are a PWM input 1, an up/down counter 2 and a frequency multiplier 3. The PWM input 1 is fed both to the up/down counter 2 and the frequency multiplier 3.

Turning first to the frequency multiplier 3, the subsystem includes a rising edge detector 4, an M-bit up counter 5, an M-bit latch 6, an M-bit programmable divider 7 and a fixed ratio divider 8. The system clock inputs to the frequency multiplier 3 at 9.

A series of pulses generated by the rising edge detector 4, and corresponding to the PWM signal frequency, is applied to the reset input of the M-bit up counter 5. The clock input of the M-bit up counter is coupled to the system clock 9 through the fixed ratio divider 8 with its division ratio defining the multiplication factor of the frequency multiplier. In operation, the up counter 5 is reset each time a rising edge of the PWM signal occurs and then counts up in response to the divided system clock to provide a count output inversely proportional to the PWM frequency. For example if the PWM frequency is low, the counter 5 will be reset relatively infrequently and thus the maximum count will be relatively high. If the PWM input is a high frequency, the up counter 5 will be reset on a more frequent basis and thus the maximum output of the counter 5 would be relatively low.

The digital output from the up counter 5 is applied to a control input of the M-bit programmable divider 7 via the M-bit latch 6. The programmable divider 7 receives at its clock input the system clock 9. The programmable divider 7 is of standard construction that will be familiar to those skilled in the art. The programmable divider 7 provides an output clock signal that has a frequency that is substantially the PWM input frequency multiplied by the division ratio of the fixed divider 8. This implements equation 1. This equation can be derived as follows:

$f_{syst}$=the frequency of the system clock signal 9.
$2^{N-1}$=the division ratio of the fixed divider 8.
$f_{PWM}$=PWM input frequency.
m=up-counter (5) count at the end of the PWM cycle.
$f_{COUNT}$=programmable divider output frequency.

$$m = \frac{f_{syst}}{2^{n-1} \cdot f_{PWM}}$$

$$f_{COUNT} = \frac{f_{syst}}{m}$$

$$f_{COUNT} = 2^{N-1} \times f_{PWM}$$

Turning to the up/down counter 2, the PWM signal is connected to the up/down control input of the up/down counter, and a further rising edge detector 10 is also connected to the parallel load control input of the up/down counter 2 to load it at 50% at the beginning of each pulse from an N-bit store (not shown). The up/down counter then counts at the rate determined by the frequency of the signal from the frequency multiplier 3 applied to the clock enable input 11. An N-bit latch 12 is latched by the rising edge detector to provide an N-bit word representing the duty ratio of the PWM signal. While the embodiment shown in FIG. 2 shows two rising edge detectors it will be apparent to the skilled person that a single rising edge detector could be used for both the up/down counter 2 and the frequency multiplier 3.

This embodiment of the invention provides a system in which the count rate of the up/down counter 2 is locked to the frequency of the incoming PWM waveform such that, in the steady state, it always counts from 50% to 100% of its range in the PWM signal period if the PWM signal is high. Thus the circuit automatically compensates for variations in frequency of the incoming PWM waveform.

The system variables M and N and the system clock frequency define the frequency range and accuracy of the demodulator.

Figure 3:
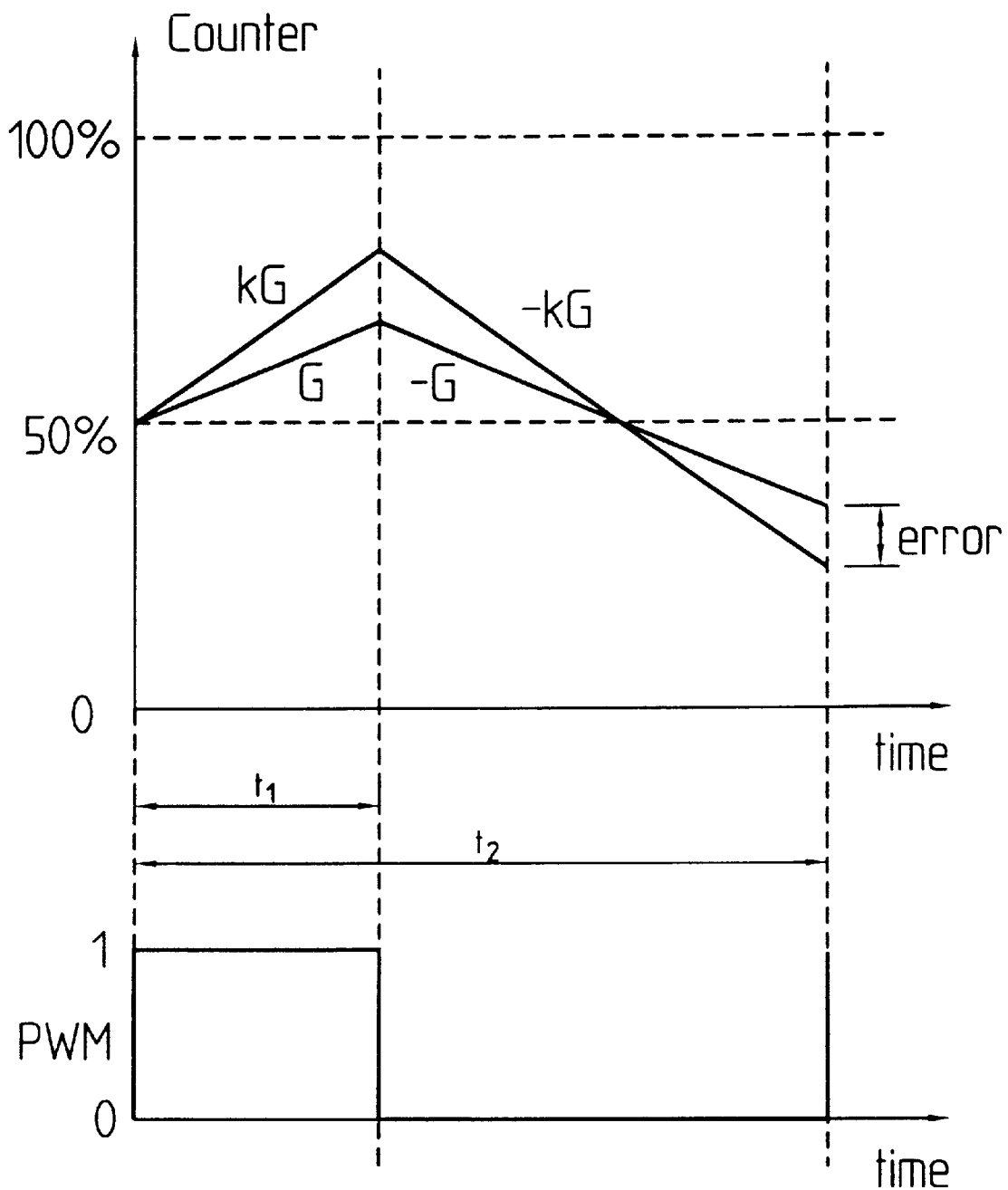
FIG. 3 shows the operation of an up/down counter with the introduction of an error factor.

It will be appreciated that the accuracy of this circuit depends mainly on the counter 2 being clocked at the correct rate. Since the clock enable input is driven by the output of the frequency multiplier 3, it follows that the accuracy of the circuit depends on the correct counting of the M-bit counter 5. This counter gives a number of counts, m, representing the period of the PWM signal, but will generally have an uncertainty of 1 in the value of m. Where the PWM signal has a low frequency, m is high and the accuracy of the clock enable signals for counter 2 is consequently high. However, at the upper end of the input signal frequency range, the performance of the system will be limited by the frequency multiplier quantization effects causing the slope G to have an error (see FIG. 3). The variation of this error is explained in FIG. 4. If, for example, the value of N=16 is used in the up/down counter 2 then the half-range $2^{N-1}$ will be 32768. The divider 8 will also divide by that factor. For this example, the system clock will be chosen to run at 10 MHz.

Figure 4:
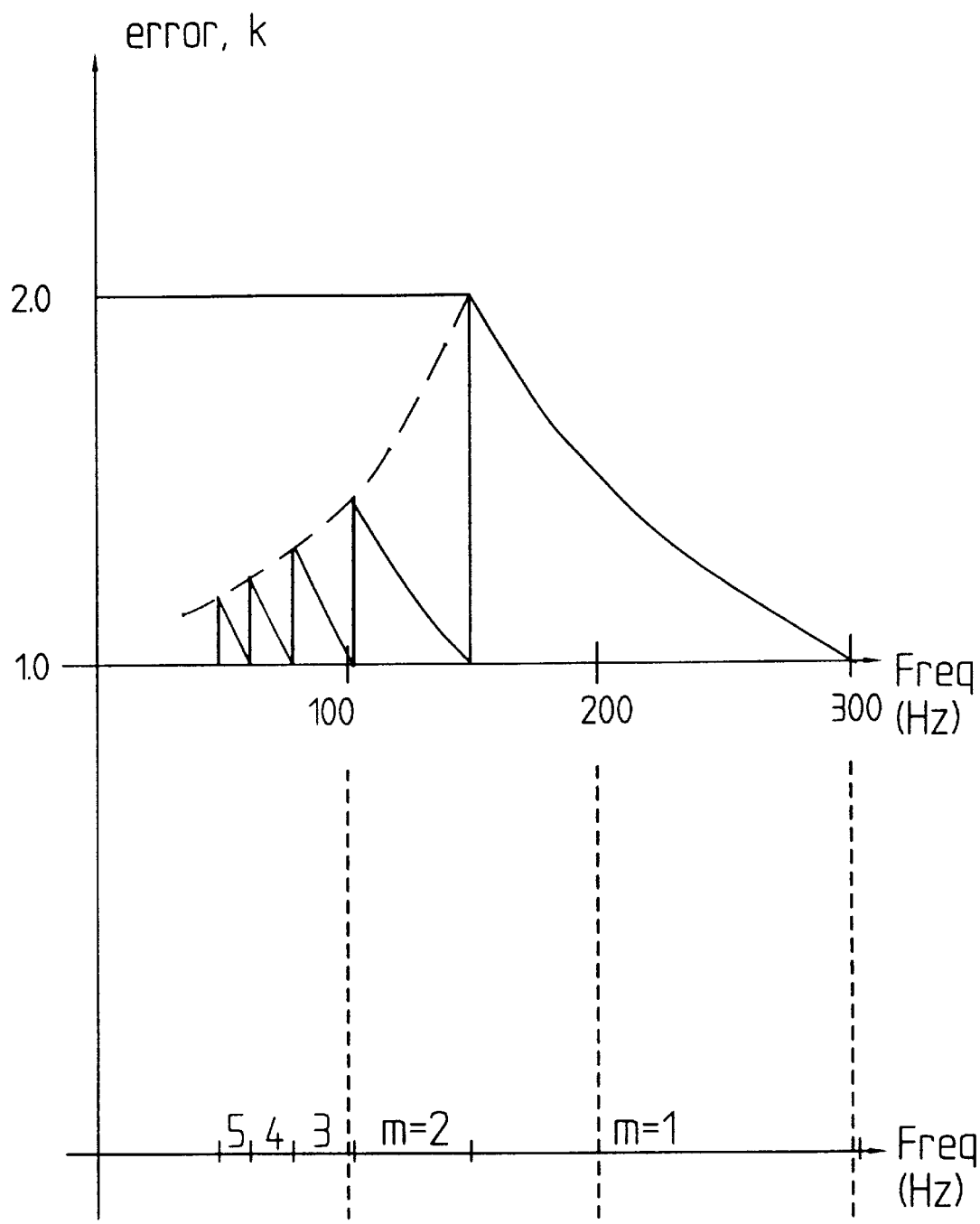
FIG. 4 shows the quantization effects of a frequency multiplier.

These system parameters define the points in time at which the M-bit counter will change count. These points can be laid out on a frequency axis as shown in FIG. 4. It is seen that m=1 over the frequency range from 305 Hz (given by 10 MHz/32768) down to 152 Hz. At this point it changes to value 2 and holds that value until the frequency reaches approximately 101 Hz, whereupon it changes to value 3. At the frequencies where the value of m changes, there is no quantization error and k=1. As the frequency reduces from, say 152 Hz with m=2, the error rises to a maximum as the counter is about to change value. This is plotted in FIG. 4 as the solid, saw-tooth shaped curve. The peaks of this curve lie on the dashed line given by:

$$k=(m+1)/m \qquad (3)$$

where m is an integer. Thus it will be seen that the maximum error occurs at around 152 Hz for this example.

The error k causes the up/down counter 2 to count at the wrong rate. For example, while the PWM signal is high, the up/down counter 2 increments at a higher rate, and when the PWM signal goes low it also decrements at the higher rate giving rise to an error in the final count. It will be seen that, dependent on the actual error and the duty cycle of the input signal, the up/down counter 2 may saturate at 100% if k is greater than 1 and the duty cycle is greater than 50% or saturate at 0% if k is greater than 1 and the duty cycle is less than 50%.

By using standard design techniques, values of N and M can be chosen for the counters 2 and 5 for a given system clock frequency. Appropriate choices will ensure that, at the highest expected frequency of the input signal, the value m of the counter 5 will be high (say greater than 10) and hence the error k will not introduce a significant error in the final count.

It is further desired for the system to indicate that, at the lower end of the frequency specification, no PWM signal is present. Accordingly a "no-PWM" signal is arranged to become high so as to select an analog demand system at a predetermined lower frequency threshold. As the number of up counts of the up counter 5 is proportional to the PWM period, the "no-PWM" signal can be set high if the up counter reaches a maximum value, known as the "terminal count". This is shown in FIG. 2 where the output TC goes high when the terminal count is reached and provides a signal on line 13. This signals to other parts of the ASIC (not shown) that the input signal is analog rather than digital in nature.

It will be realized by those skilled in the art that the various circuit components shown as digital components can be replaced, either in whole or in part, by analog components. For example, the up/down counter could be replaced by an analog integrator if that were preferable in a particular implementation. Similarly, while embodiments of the invention are specifically described in relation to the demodulator being triggered on a rising edge of the PWM signal, it is equally the case that the trigger could occur on any other repeating stable event in the PWM period. For example, the event could be a moment a predetermined duration after the start of each PWM cycle which could be a rising or falling edge, depending on the arrangement of the PWM signal.

While the invention is susceptible to various modifications and alternative forms, specific embodiments have been shown by way of example in the drawings and have been described in detail. It should be understood, however, that this is not intended to limit the invention to the particular forms disclosed. On the contrary, the invention covers all modifications, equivalents and alternatives falling within the scope of the invention as defined the appended claims.

What is claimed is:

1. A demodulator for a pulse width modulated (PWM) signal which alternates between first and second states, the demodulator comprising:

means for up/down counting, the up/down counting means having a PWM signal input and a set input for a signal indicative of an event in the PWM signal period to which the up/down counting means is responsive to set a predetermined first value therein; and count rate setting means for setting a count rate of the up/down counting means such that the up/down counting means would count from the first value to a predetermined second value over the PWM signal period, the up/down counting means being responsive to one of the first and second states of the PWM signal at the said event to count in one direction at the count rate from the first value and, thereafter, responsive to the other of the first and second states of the PWM signal to count at the count rate in the other direction, such that an output of the up/down counting means is an output value representative of the duty ratio of the PWM signal;

wherein the count rate setting means comprises a programmable divider and divider programming means responsive to the PWM signal.

2. A demodulator as claimed in claim 1 in which the second value is the maximum registrable value of the up/down counting means.

3. A demodulator as claimed in claim 2 in which the up/down counting means is responsive to said input to be loaded with a value of half the maximum registrable value of the up/down counting means as the first value.

4. A demodulator as claimed in claim 1 in which the up down counting means includes an N-bit digital register.

5. A demodulator as claimed in claim 4 further including an N-bit latch connected with the output of the up/down counting means and a PWM signal event detector arranged to enable the latch to output the value representative of the duty ratio of the PWM signal.

6. A demodulator as claimed in claim 5 in which the event detector is a rising edge detector.

7. A demodulator as claimed in claim 1, including count rate setting means for receiving a signal indicative of the PWM signal frequency and locking the count rate to the PWM signal frequency.

8. A demodulator as claimed in claim 7 in which the count rate setting means includes:
- a second counter arranged to count at a fixed rate and output a maximum second count value; and
- a latch arranged to receive the maximum second count value and to latch on each rising edge of the PWM signal;
- wherein the programmable divider is arranged to receive the second count value from the latch and to divide a fixed frequency by the latched second count value to derive the count rate.

9. A demodulator as claimed in claim 8, including a fixed ratio divider arranged to divide a system clock frequency by a predetermined factor to derive the fixed frequency.

10. A demodulator as claimed in claim 9 in which the predetermined factor is half the maximum count value of the up/down counting means.

11. A demodulator as claimed in claim 8 including means for producing a no-PWM signal when the PWM signal frequency is below a predetermined value.

12. A demodulator as claimed in claim 11, in which the no-PWM signal producing means is operable to produce an output when the maximum second count value is exceeded.

13. A demodulator as claimed in claim 1, including a frequency multiplier having a first variable frequency input and a second system clock input and an output frequency equal to the product of the first input frequency and a predetermined multiplying factor, the frequency multiplier further including an up counter, a latch arranged to latch on each PWM signal rising edge, the programmable divider and a fixed ratio divider set to divide by the predetermined multiplication factor, wherein the up counter is arranged to count up at the system clock frequency divided by the predetermined multiplication factor, and to output the value to the latch, and wherein the programmable divider is arranged to divide the system clock frequency by the latched up count value.

14. A method of demodulating a pulse width modulated (PWM) signal which alternates between first and second states, the method comprising:
- providing a signal indicative of an event in the PWM signal period to an up/down counter such that a predetermined first value is set in the counter; and
- setting a count rate of the up/down counter such that the up/down counter would count from the first value to a predetermined second value over the PWM signal period, the up/down counter responding to one of the first and second states of the PWM signal at the said event to count at the count rate in one direction from the first value and, thereafter, responding to the other of the first and second states of the PWM signal to count at the count rate in the other direction, the output of the up/down counter being an output value that is representative of the duty ratio of the PWM signal;
- wherein the setting step includes programming a programmable divider responsive to the PWM signal.

15. A method as claimed in claim 14 in which the second value is the maximum registrable value of the up/down counter.

16. A method as claimed in claim 15 in which the up/down counter responds to said input to be loaded with a value of half the maximum registrable value of the up/down counter as the first value.

17. A method as claimed in claim 14 in which the up/down counter has an N-bit digital register.

18. A method as claimed in claim 17 further including latching the output of the up/down counter and enabling the latch at said event to output the output value.

19. A method as claimed in claim 18 in which the event is a rising edge on the PWM signal.

20. A method as claimed in claim 14, including setting a count rate on receipt of a signal indicative of the PWM signal frequency, the setting step including locking the count rate to the PWM signal frequency.

21. A method as claimed in claim 20, including:
- counting with a second counter at a fixed rate and outputting a second count value;
- latching the second count value on each rising edge of the PWM signal; and
- applying the latched second count value to the programmable divider and dividing a fixed frequency by the latched second count value to derive the count rate.

22. A method as claimed in claim 21, including dividing a system clock frequency by a predetermined factor to derive the fixed frequency.

23. A method as claimed in claim 22 in which the factor is half the maximum count value of the up/down counter.

24. A method as claimed in claim 14, including producing a no-PWM signal when the PWM signal frequency is below a predetermined value.

25. A method as claimed in claim 24 in which the no-PWM signal is produced when the maximum second count value is exceeded.

26. A demodulator for a pulse width modulated (PWM) signal which alternates between first and second states, the demodulator comprising:
- an up/down counter having a PWM signal input and a set input for a signal indicative of an event in the PWM signal period to which the counter is responsive to set a predetermined first value therein; and
- a count rate setter for setting a count rate of the counter such that the up/down counter would count from the first value to a predetermined second value over the PWM signal period, the up/down counter being responsive to one of the first and second states of the PWM signal at the said event to count at the count rate in one direction from the first value and, thereafter, responsive to the other of the first and second states of the PWM signal to count at the count rate in the other direction, such that an output of the up/down counter is an output value representative of the duty ratio of the PWM signal;
- wherein the count rate setter comprises a programmable divider arranged to be programmable in response to the PWM signal.

27. A demodulator as claimed in claim 26 in which the second value is the maximum registrable value of the up/down counter.

28. A demodulator as claimed in claim 27 in which the up/down counter is responsive to said input to be loaded with a value of half the maximum registrable value of the up/down counter as the first value.

29. A demodulator as claimed in claim 26, said count rate setter being arranged to receive a signal indicative of the PWM signal frequency and to lock the count rate to the PWM signal frequency, the count rate setter including:
- a second counter arranged to count at a fixed rate and output a maximum second count value; and a latch arranged to receive the maximum second count value and to latch on each rising edge of the PWM signal;

wherein the programmable divider is arranged to receive the second count value from the latch and to divide a fixed frequency by the latched second count value to derive the count rate.

30. A demodulator as claimed in claim 29, including a no-PWM signal producer when the PWM signal frequency is below a predetermined value, the no-PWM signal producer being operable to produce an output when the maximum second count value is exceeded.

31. A demodulator as claimed in claim 26, including a frequency multiplier having a first variable frequency input and a second system clock input and an output frequency equal to the product of the first input frequency and a predetermined multiplying factor, the frequency multiplier further including an up counter, a latch arranged to latch on each PWM signal rising edge, a programmable divider and a fixed ratio divider set to divide by the predetermined multiplication factor, wherein the up counter is arranged to count up at the system clock frequency divided by the predetermined multiplication factor, and to output the value to the latch, and wherein the programmable divider is arranged to divide the system clock frequency by the latched up count value.

32. A demodulator for a pulse width modulated (PWM) signal which alternates between first and second states, the demodulator comprising:

an up/down counter having a PWM signal input and a set input for a signal indicative of an event in the PWM signal period to which the counter is responsive to set a predetermined first value therein;

a count rate setter for setting a count rate of the counter such that the up/down counter would count from the first value to a predetermined second value over the PWM signal period, the up/down counter being responsive to one of the first and second states of the PWM signal at the said event to count at the count rate in one direction from the first value and, thereafter, responsive to the other of the first and second states of the PWM signal to count at the count rate in the other direction, such that an output of the up/down counter is an output value representative of the duty ratio of the PWM signal, said count rate setter being arranged to receive a signal indicative of the PWM signal frequency and to lock the count rate to the PWM signal frequency, the count rate setter including:

a second counter arranged to count at a fixed rate and output a maximum second count value;

a latch arranged to receive the maximum second count value and to latch on each rising edge of the PWM signal; and a programmable divider arranged to receive the second count value from the latch and to divide a fixed frequency by the latched second count value to derive the count rate.

33. A method of demodulating a pulse width modulated (PWM) signal which alternates between first and second states, the method comprising:

providing a signal indicative of an event in the PWM signal period to an up/down counter such that a predetermined first value is set in the counter;

setting a count rate of the up/down counter such that the up/down counter would count from the first value to a predetermined second value over the PWM signal period, the up/down counter responding to one of the first and second states of the PWM signal at the said event to count at the count rate in one direction from the first value and, thereafter, responding to the other of the first and second states of the PWM signal to count at the count rate in the other direction, the output of the up/down counter being an output value that is representative of the duty ratio of the PWM signal; and producing a no-PWM signal when the PWM signal frequency is below a predetermined value.

* * * * *